March 26, 1957 A. B. VIETH 2,786,433
BATTERY PLATE ASSEMBLING MACHINE
Filed Oct. 18, 1950 7 Sheets-Sheet 2

Inventor
Albert B. Vieth
By Henry Canahan
Attorney

March 26, 1957 A. B. VIETH 2,786,433
BATTERY PLATE ASSEMBLING MACHINE
Filed Oct. 18, 1950 7 Sheets-Sheet 3
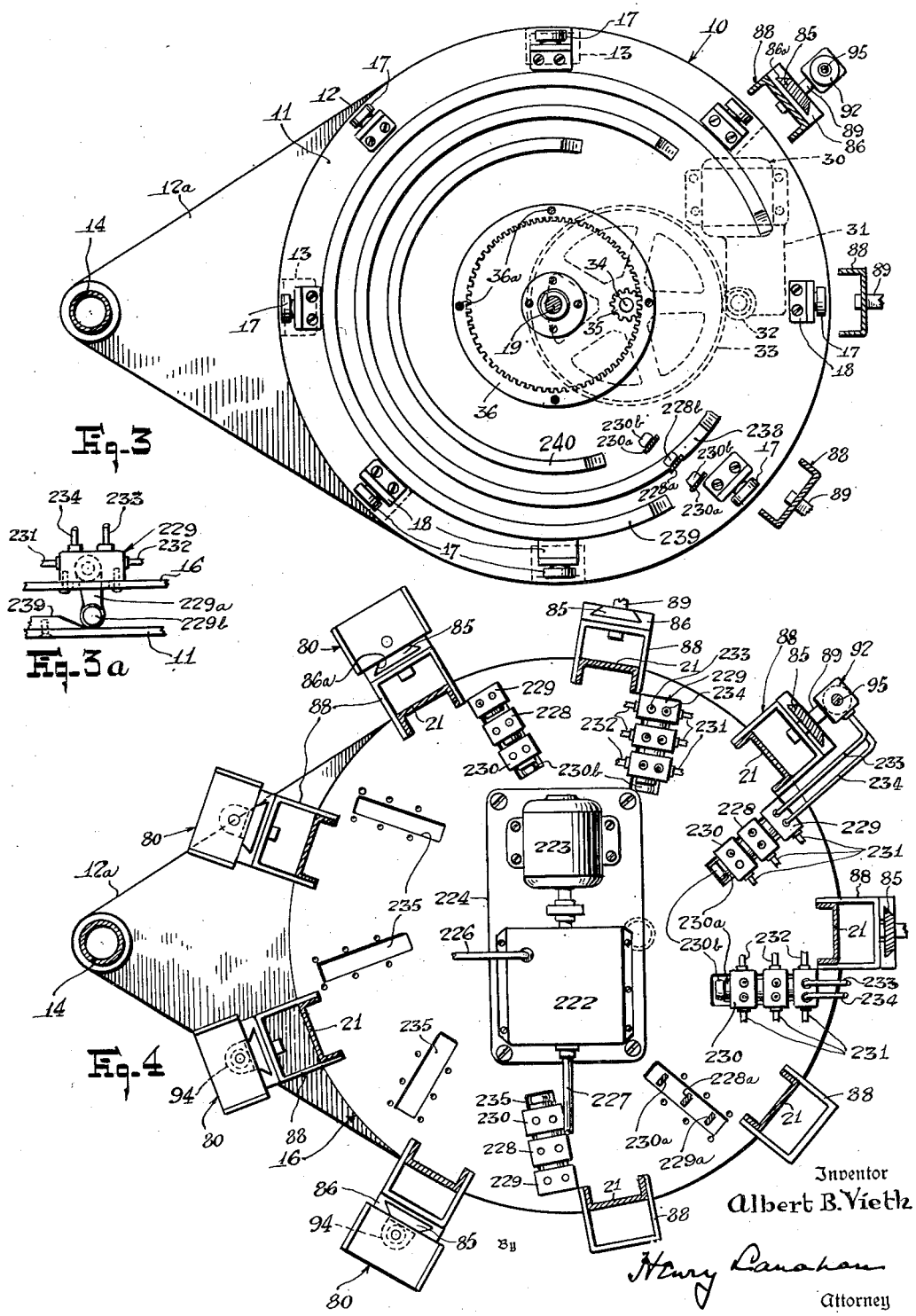
Inventor
Albert B. Vieth
By Henry Lanahan
Attorney

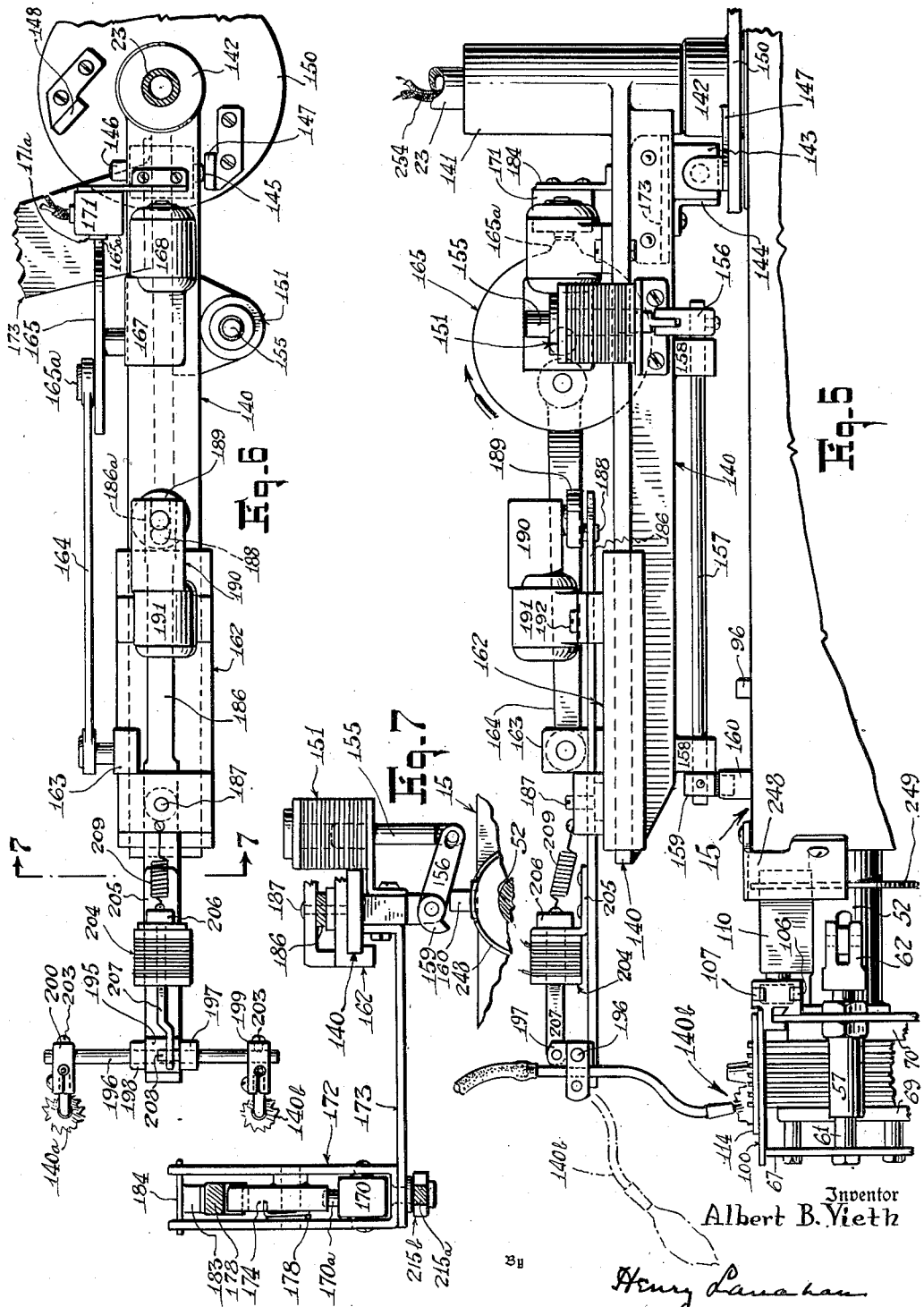

March 26, 1957 A. B. VIETH 2,786,433
BATTERY PLATE ASSEMBLING MACHINE
Filed Oct. 18, 1950 7 Sheets-Sheet 5

Inventor
Albert B. Vieth
By Henry Lanahan
Attorney

March 26, 1957 A. B. VIETH 2,786,433
BATTERY PLATE ASSEMBLING MACHINE
Filed Oct. 18, 1950 7 Sheets-Sheet 6

Inventor
Albert B. Vieth
By Henry Canahan
Attorney

March 26, 1957      A. B. VIETH      2,786,433
BATTERY PLATE ASSEMBLING MACHINE
Filed Oct. 18, 1950      7 Sheets-Sheet 7

Inventor
Albert B. Vieth
By Henry Lanahan
Attorney

United States Patent Office 2,786,433
Patented Mar. 26, 1957

2,786,433

BATTERY PLATE ASSEMBLING MACHINE

Albert B. Vieth, Kearny, N. J., assignor, by mesne assignments, to McGraw-Edison Company, Elgin, Ill., a corporation of Delaware Application October 18, 1950, Serial No. 190,781

3 Claims. (Cl. 113—59)

This invention relates to a machine for assembling battery plates and separators into finished cell groups adapted for mounting in a battery case. More particularly, the invention relates to a machine adapted to receive loose assemblies of battery plates and separators for individual cells and to process automatically those groups into finished cell units by locating the plates in proper spatial relation and then lead-burning a strap to the plates of each polarity.

A cell group for a typical lead-acid storage battery comprises a stack of alternating positive and negative plates with intervening insulating separators between adjacent plates, the separators having typically a greater height than the plates by about ⅜" so as to extend above the plates by that amount in a finished cell unit. In processing such a cell group into a finished cell unit the plates of each polarity are connected to a lead strap provided with a terminal post. These connections are made by providing each plate with an extending lug, assembling the plates of the cell group so that the lugs of all plates project in the same direction with those of the positive plates being aligned at one side of the stack and those of the negative plates aligned at the other side, and then lead-burning a strap to each set of lugs. The usual form of strap comprises a lead bar having teeth that fit between the lugs of each set, which teeth are fuzed to the lugs by means of a flame.

The present machine comprises a series of cell-group holders for receiving loose assemblies of battery plates and intervening separators prearranged with the lugs in proper alignment as above described. Each cell-group holder is adapted to bring the plates and separators into proper alignment, and is then operated so as to clamp the cell group and concurrently dam a mold space around the lugs of each set of plates. Into these mold spaces there are inserted straps with terminal posts and teeth that intermesh with the lugs of the plates. After the straps are so inserted, a flame is moved automatically with a zigzag motion along each row of lugs, and back again, to fuze the lugs to the straps. The holder is then released to unclamp the plates so that they can be removed from the machine. At one station an operator will insert loose group assemblies in successive holders as they move thereby; at a later station another operator will insert the straps into the successive mold spaces; and at a still further station another operator will remove the finished units. Except for the manual feeding of the loose assemblies and straps to the machine and the removal of the finished units, all operations are performed automatically by the machine, the operation being such that the holders are operated in recurring sequence, and the lead-burning operations are carried out on successive cell groups as the holders are moved past a lead-burning station.

An object of my invention is to provide an improved machine for carrying out economically and effectively the assembling operations above described.

More particularly, it is an object to provide such a machine which will produce a stronger and more durable joint between the plates of each polarity and the respective connecting strap and to do so without shorting any of the plates of opposite polarity. In this respect it is a feature of my invention to provide the lead-burning torches with a zigzag motion which will puddle the lead and produce a positive fusion of the strap with the entire cross sectional area of each lug.

Another object is to provide an efficient form of such machine wherein a continuously-moving conveyor for the cell group holders and a reciprocating carriage for the lead burners have intermittent coincident motion during the periods in which the lead-burning operations are carried out on successive cell groups.

Another object is to provide the burners with a reciprocating zigzag motion relative to the carriage whereby a strap-puddling operation is carried out.

Another object is to provide a novel and efficient form of cell-group holder for such machine comprising a support and end-alignment means for the loose assemblies of plates and separators, which support and alignment means is adapted to cooperate with a pair of clamping plates to form a receptacle to receive the loose assembly, the support and end-alignment means being removable from the clamping plates after the latter have closed to hold the plates and separators in place.

Another object is to provide an improved and efficient hydraulically-operated means to actuate the several operating components of the machine so that they will perform their operations positively and in proper sequence.

Still other objects and features of the invention reside in the details of structure and the novel cooperation of elements by which the functions of the machine are carried out efficiently and in a novel manner.

These and other objects and features of the invention will be apparent from the following description and the appended claims, with reference to the following drawings, of which:

Figure 1a is a detailed sectional view taken on the line 1a—1a of Figure 1;

Figure 3 is a horizontal cross sectional view taken on the line 3—3 of Figure 2;

Figure 3a is a detailed sectional view of one of the several hydraulic valves mounted on the conveyor and used to actuate certain parts of the machine;

Figure 4 is a horizontal cross sectional view taken on the line 4—4 of Figure 2;

Figure 5 is a side elevational view of the carriage for the lead burner, showing also a portion of the conveyor and one of the cell-group holders;

Figure 6 is a top plan view of the burner carriage shown in Figure 5;

Figure 7 is a sectional view taken on the line 7—7 of Figure 6;

Figure 2:
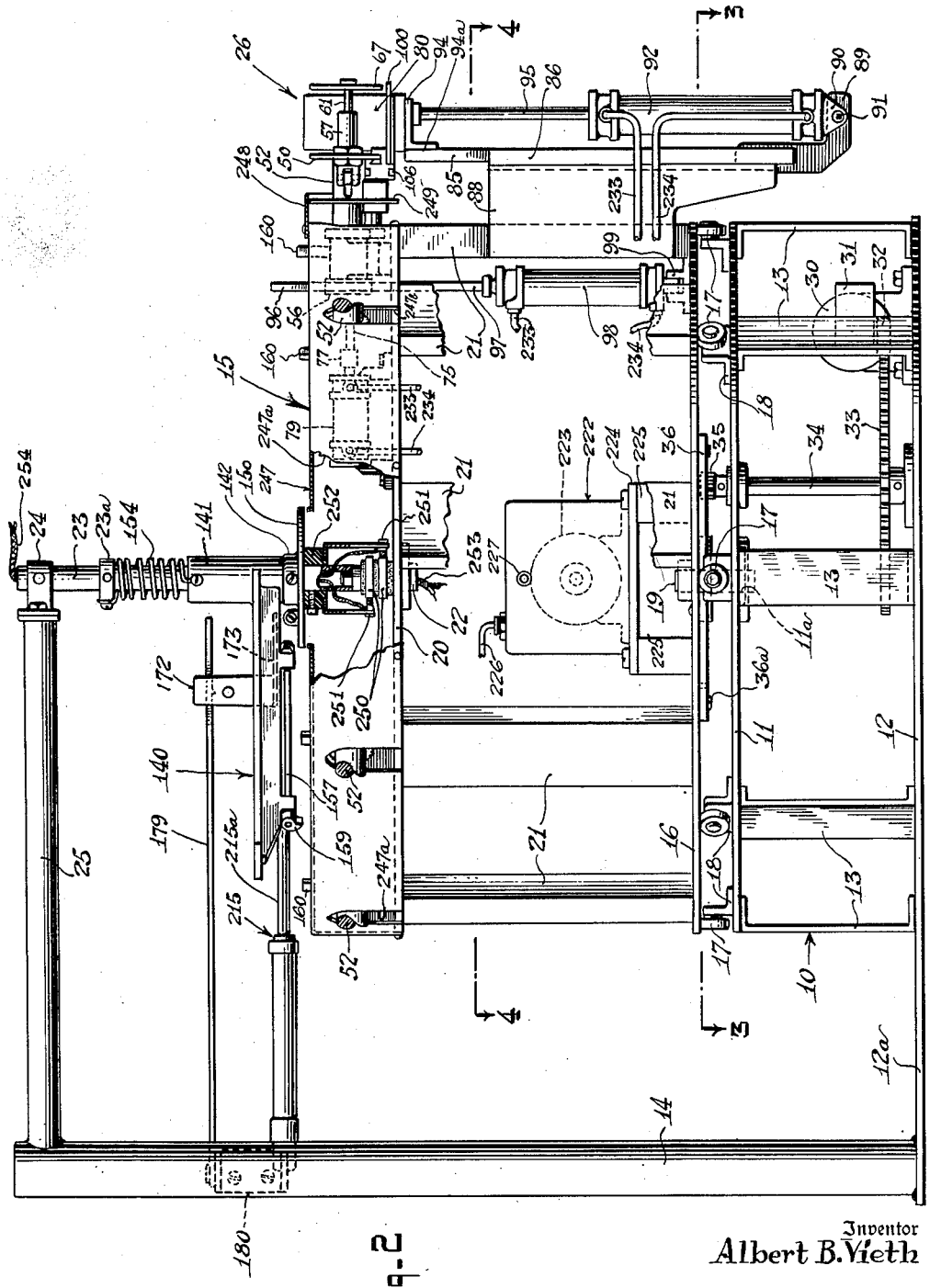
Figure 2 is a side elevational view of the machine of Figure 1 in which certain parts are omitted and other parts are broken away.

The present machine comprises a stationary base frame 10 formed like a cage and comprising top and bottom plates 11 and 12 connected rigidly together by heavy angle irons 13 (Figures 2, 3 and 4). The plates 11 and 12 are circular except that the bottom one has a radial extension 12a to support a heavy post 14 at the side of the machine for purposes hereinafter explained.

Figure 1:
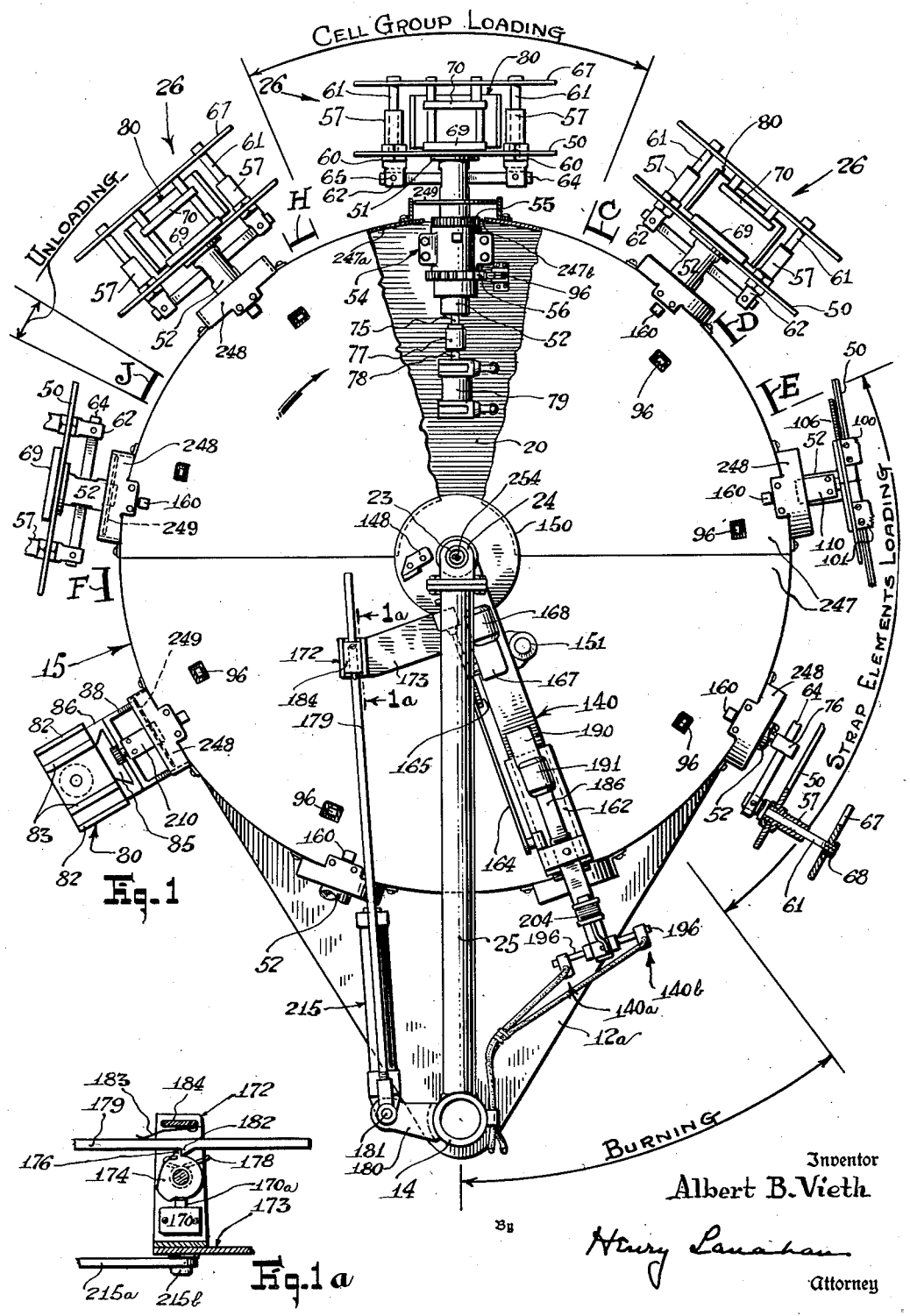
Figure 1 is a top plan view, with parts removed and parts broken away, of a battery plate assembling machine constructed according to the present invention.

The base frame 10 carries a large conveyor 15 for rotation in a horizontal plane as shown in Figures 1 and 2. This conveyor has a depending shaft 19 journalled in a central bearing 11a in the top plate 11. For vertical support the conveyor has a circular base plate 16 resting on a series of rollers 17 journalled on respective brackets 18 that are mounted on the top plate 11 of the base 10, the rollers being spaced at equal intervals about the bearing 11a. The conveyor has a top plate 20 held in fixed spatial relationship to the lower plate 16 and at a considerable distance thereabove by means of a series of intervening channel members 21 which are bolted or welded to the respective plates. There are nine of these channel members positioned at 40° intervals about the shaft 19, which is the same as the number of cell-group holders mounted on the conveyor, as will be apparent. Secured to the top plate 20 is an upstanding shaft 22 aligned with the lower shaft 19 of the bottom plate 16. This shaft 22 engages internally an upstanding tubular shaft 23. The upper end of this shaft is held rigid in vertical position by means of a clamping bracket 24 mounted on the end of a horizontal arm 25 that is secured to the post 14 beforementioned.

The conveyor is rotated clockwise at constant speed (typically at a rate of one revolution per minute) by means of an electric motor 30 mounted on the bottom plate 12 of the base 10, as shown in Figures 2 and 3. This motor has a gear reduction box 31 driving a pinion 32 which meshes with a gear 33. The gear 33 is pinned to a vertical shaft 34 journalled in the plates 11 and 12. This shaft extends above the plate 11 and carries at its upper end a pinion 35 which meshes with an internal ring gear 36 secured to the under side of the base plate 16 of the conveyor by means of screws 36a.

There are nine cell-group holders 26 extending radially from the conveyor and positioned vertically in line with the channel members 21 respectively. These holders are adapted to receive loose assemblies of battery plates and separators for individual cells, prearranged as hereinbefore described, with the lugs of the plates extending downwardly. As will appear, each holder is adapted to align the plates and separators properly as the loose assembly is inserted therein. The holders then clamp the assembly to hold the plates and separators in fixed relation, and next turn the assembly 180° to cause the lugs to project upwardly. The lead-burning of the lugs to the straps is next carried out after which the holder is turned back to place the cell group in its initial inverted position. The holder then releases the cell group for discharge from the machine and is restored to its initial cell-group receiving condition to receive another loose cell-group assembly for processing. This series of operations is carried out as to each holder as the conveyor is moved through one revolution, there being accordingly nine cell groups completed per minute for the rate of movement of the conveyor abovementioned.

Figure 12:
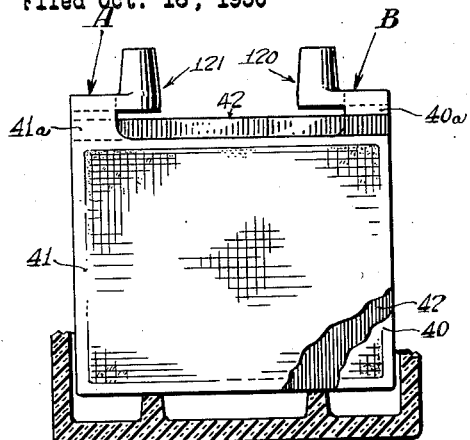
Figure 12 shows a finished cell group after it has been fully processed by the present machine and placed in a battery case, the case being shown only partially.

A completed cell unit appears in Figure 12. Herein, positive and negative plates are referred to as 40 and 41 respectively, their lugs as 40a and 41a respectively, and the separators as 42. The lead straps with respective terminal posts are burned to the lugs at A and B respectively. By this burning operation, the plates of the loose assembly are secured in fixed relation for insertion of the cell unit into a battery case as shown. The cell-group holders are identical and so a description of one will suffice for all.

Figure 8:
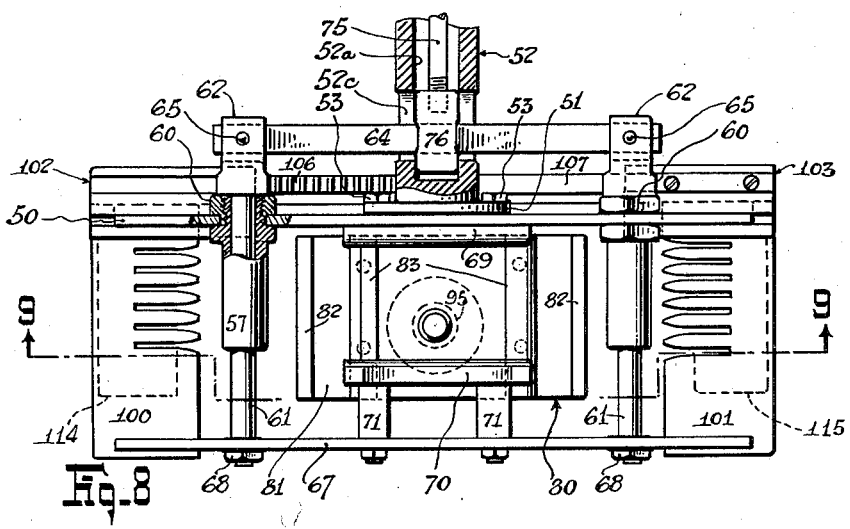
Figure 8 is a top plan view, with parts broken away, showing one of the cell-group holders.
Figures 9, 11:
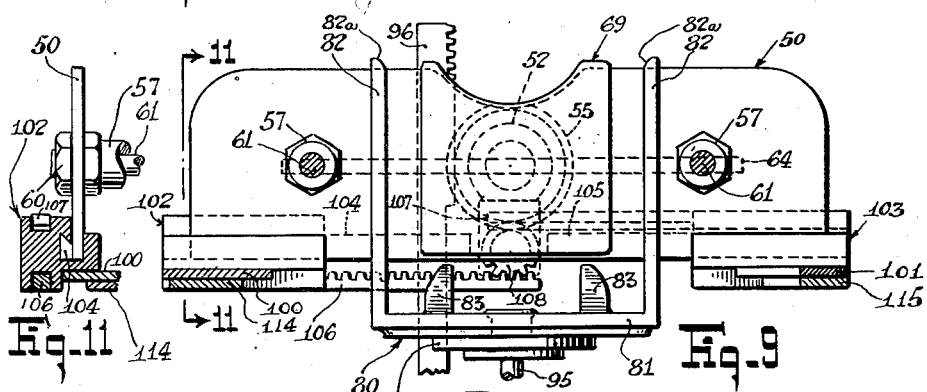
Figure 9 is a vertical cross sectional view through a cell-group holder taken on the line 9—9 of Figure 8.
Figure 11 is a detailed view taken along the line 11—11 of Figure 9.

As shown in Figures 1, 3 and 8 through 11, a cell-group holder 26 comprises a pair of vertical side walls 69 and 70 forming clamping members and a U-shaped cradle or support 80 having a base 81 and upstanding end walls 82 which, when the holder is in receiving position, cooperate with the side walls to form a receptacle open at the top. The side wall 69 is mounted on a vertical frame plate 50 which in turn is secured by the bolts 53 to an end flange 51 on a horizontal shaft 52. The shaft extends radially from the conveyor and is journalled in a bearing 54 mounted on the top plate 20 directly above the respective one of the channel members 21. A stationary gear 55 is mounted on the outer end of the bearing 54 in surrounding relation with the shaft 52. On the inner end of the shaft 52 there is pinned a gear 56 which is retained normally in abutting relation with the inner end of the bearing 54 as by a suitable thrust bearing (not shown) acting against the inner end of the shaft. On the frame plate 50 at opposite ends of the clamping wall 69 beyond the end walls of support 80 are hollow studs secured in place by nuts 60 and forming bushings 57. Rods 61 extend slidably through these bushings and have heads 62 at the inner side of the frame plate 50 which abut normally against the nuts 60. A cross bar 64 has its end portions engaging slots in the heads 62 and secured thereto by pins 65. The central portion of the cross bar extends through a slot 52c in the shaft 52 and is embraced by an apertured head 76 mounted slidably in a bore 52a of this shaft. This head is secured to a connecting rod 75 for moving the rods 61 in unison relative to the respective bushings 57. A vertical frame plate 67 is secured to the outer ends of the rod 61 by nuts 68. Mounted on the inner side of this frame plate are studs 71 which carry the second clamping wall 70 aforementioned. When the rods 61 are in their outermost position as shown in Figure 8, the side walls 69 and 70 are spaced apart sufficiently to receive therebetween a loose assembly of battery plates and separators constituting a cell unit.

The rod 75 extends beyond the hollow shaft 52 and is connected by a coupling 77 to a piston rod 78 of a hydraulic cylinder 79 as shown in Figures 1 and 2. This cylinder serves to draw the rod 75 inwardly to exert clamping pressure of the side walls 69 and 70 against the plate assembly to hold the plates and separators thereof positively in fixed relation during the burning operation; similarly, the hydraulic cylinder is operable to open the clamping walls to permit discharge of the finished assembly after the burning operation, as will appear.

Figure 14:
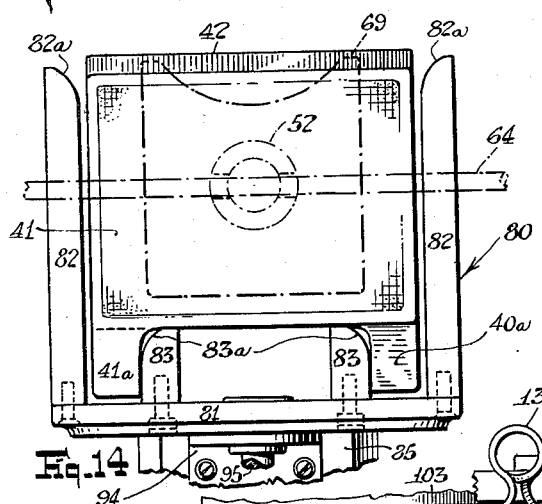
Figure 14 is a partial elevational view showing the battery plates as they are received by the cell-group holder.
Figure 15:
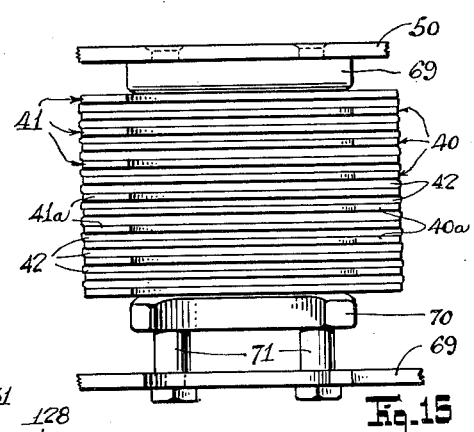
Figure 15 is a plan view showing the battery plates in position to be clamped by the hydraulically-operated clamp associated with each cell-group holder.

The end walls 82 of the U-shaped support 80 have beveled top edges at 82a (Figure 14) to facilitate the insertion of the cell group into the holder. The spacing between the end walls is such that by sliding engagement of the opposite edges of the plates and separators thereagainst, as the assembly is inserted into the holder, the plates and separators are moved into approximate alignment. Final alignment is obtained, as the assembly comes to rest in the holder, by the sliding engagement of the inner edges of the plate lugs 40a and 41a with the outer sides of two cross bars 83 mounted on the bottom wall 81. These bars also have beveled edges, at 83a, to facilitate their guiding action on the plates; also, these bars stand higher than the length of the lugs so that the plates will come to rest upon the cross bars. Since the separators normally extend beyond the plates as shown in Figure 12, they first contact the cross bars and are displaced with respect to the battery plates as the plates move farther downwardly onto the bars. By this displacement a greater separation is obtained between the separators and the straps. This is beneficial in that it mitigates the possibility of the separators being scorched during a burning operation.

As is shown in Figure 2, the support 80 is mounted on a bracket 94 which is secured at 94a to a vertically-extending bar 85. The bar 85 has a dovetailed sliding engagement with a guideway 86a of a plate 86 mounted on an angle iron 88 that is secured to the respective one of the channel members 21 of the conveyor. Extending downwardly from the bracket 94 is a piston rod 95 of a hydraulic cylinder 92. The cylinder has a lug 90 depending at its lower end which is pivotally connected by a pin 91 to a bracket 89 secured to the lower portion of the angle iron 88. This cylinder is actuatable to hold the support in its uppermost position shown in Figure 2 and to move the support downwardly below the clamping walls 69 and 70. When the support 80 is held in its uppermost position, and the clamping walls 69 and 70 are held apart by the hydraulic cylinder 79, the holder 26 is in its receiving condition.

The timing of the two hydraulic cylinders 79 and 92 is such that after the holder is moved by the conveyor beyond the loading station, whereat loose cell groups are inserted into the holders, the cylinder 79 is actuated to clamp the plate assembly and then the cylinder 92 is actuated to lower the support 80 below the clamped assembly. Thereupon the assembly is inverted, by rotating the shaft 52 through 180°, to bring the plate lugs into upright positions before the holder reaches the burning station.

The rotation of the shaft 52 to invert the holder 26 and bring the cell group to an upright position is effected by a hydraulic cylinder 98 shown in Figures 1 and 2. This cylinder stands in an upright position and is pivotally mounted at its lower end, at 99, to the bottom plate 16 of the conveyor. The cylinder has an upstanding piston rod 97 which extends slidably through the top plate 20 of the conveyor to hold the cylinder in its upright position. Connected to the upper end of this piston rod is a rack 96 which meshes with the aforementioned gear 56 on the shaft 52. When the piston rod 97 is in its uppermost position shown in Figure 2, the holder 26 is in a receiving position, and when this piston rod is in its lowermost position the shaft 52 will have been turned 180°, the clamping walls 69 and 70 will have been inverted and the cell group will be now in its upright position as shown in Figures 10, 13 and 16.

Figure 10:
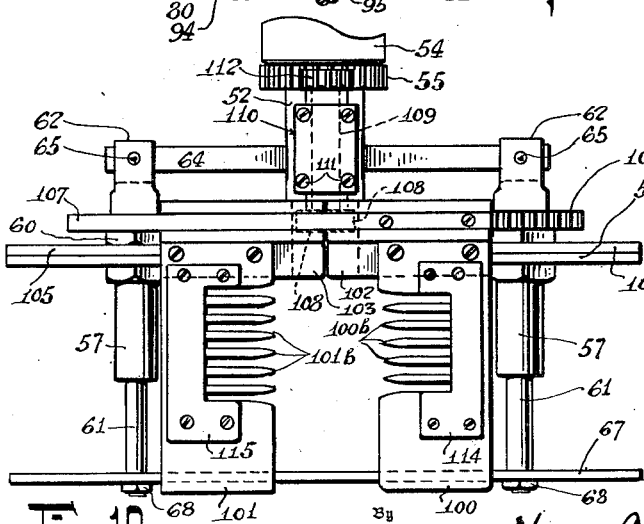
Figure 10 is a bottom plan view of the cell-group holder shown in Figure 8.

In order to restrain the molten lead from flowing downwardly between the battery plates and onto the separators during the lead burning of the straps to the plate lugs, each holder 26 is provided with a pair of horizontal, movably-mounted, mold structures 100 and 101 (Figures 8 to 11 inclusive). The mold structures extend outwardly from the lower opposite end portions of the frame plate 50, and are slidably mounted on this plate by being secured to respective blocks 102 and 103 which have interlocking sliding engagement with dovetailed strips 104 and 105 fastened to the frame plate, as shown particularly in Figure 11. Secured to the blocks at the inner side of the frame plate 50 are respective horizontal racks 106 and 107 which mesh respectively with the top and bottom portions of a pinion 108. This pinion is secured to the outer end of a shaft 109 which is journalled in a bearing block 110 that is secured by screws 111 to the shaft 52 (Figure 10). The shaft 109 extends through this bearing and has a pinion 112 secured to its inner end which meshes with the aforementioned stationary gear 55. As the holder 26 is turned counterclockwise by downward propulsion of the rack 96, to place the cell group in an upright position for the burning operation, the pinion 112 is moved as a planetary gear about the stationary gear 55 to turn the pinion 108 counterclockwise as it appears in Figure 9. The pinion 108 thus actuates the racks 106 and 107 to draw the mold structures 100 and 101 inwardly into their effective positions shown in Figure 10. Vice versa, as the rack 96 is propelled upwardly to restore the cell group to its initial position, the pinion 108 is turned clockwise to move the mold structures to their outermost positions.

The mold structures have walls formed by U-shaped members 114 and 115 respectively which, when the mold structures are in effective positions, dam the outer sides and ends of the respective rows of plate lugs where the lugs are to be fuzed to the straps. Also, these mold structures have teeth 100b and 101b which, when the mold structures are in their effective positions, engage the spaces between the plate lugs at the base of the lugs to space the plates properly and to close the spaces so that molten lead may not fall down between the plates onto the separators as the lugs and straps are fuzed together. The number of teeth provided on the mold structures depends on the number of plates in the cell group to be processed. The present mold structures are adapted for processing a cell group of 13 plates, and accordingly they are provided with five teeth 100b for engaging the five spaces between the six positive plates and with six teeth 101b for engaging the six spaces between the seven negative plates.

Figure 13:
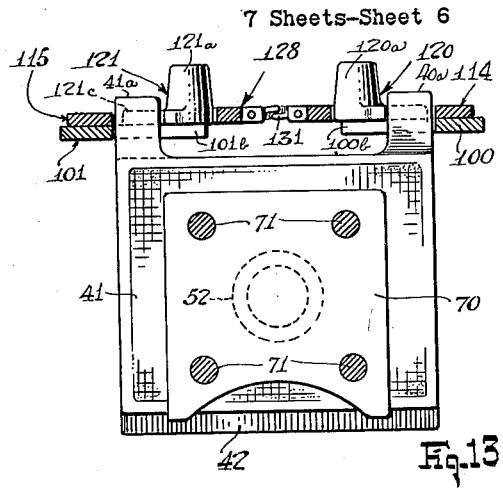
Figure 13 is a view partially in elevation and partially in cross section, showing the battery plates in position to be fuzed to the associated straps.
Figure 16:
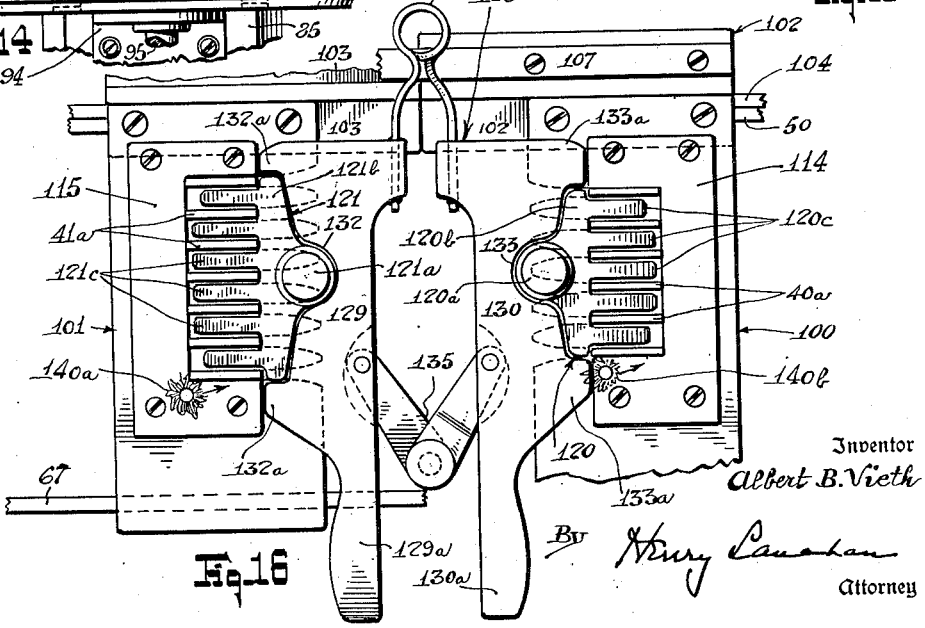
Figure 16 is a plan view, with parts broken away, of the bottom side of one of the cell-group holders, showing particularly the supporting means for the straps and the mold means for retaining the molten lead during a burning operation.

The strap elements to be burned to the positive and negative plates are referred to in Figures 13 and 16 as 120 and 121 respectively. Each of these elements comprises a terminal post, a cross strap, and a series of teeth extending from the strap, which are referred to respectively by the number of the element with the suffix letters a, b and c respectively. The strap element 120 has five teeth for engaging the six lugs of the positive plates and the element 121 has six teeth for engaging the seven lugs of the negative plates. The strap elements are inserted by hand, by an operator, after the holder has been inverted, each element being placed in a position wherein it rests on the teeth of the mold structure and the teeth of the strap element intermesh with the plate lugs. Next, the operator inserts a hand fixture 128 onto the mold structures in the space between the strap elements for the purpose of holding the elements firmly in positions wherein the inner ends of the recesses between the teeth thereof bear against the respective plate lugs. The fixture 128 comprises two flat members 129 and 130 having handle portions 129a and 130a, a toggle 135 between the central portions of these members to hold them in planar relationship, and a torsion spring 131 at their outer ends to urge the members apart. The outer edges of the members 129 and 130 are recessed at 132 and 133 to conform to the respective strap elements and have lug portions 132a and 133a at the opposite ends of the recesses for abutment against the end portions of the mold members 114 and 115 under pressure of the torsion spring 131. To insert the fixture, the operator grips the handle portions and presses the two members 129 and 130 together against the force of the torsion spring, then inserts the fixture in the space between the strap elements as shown in Figure 16, and thereupon releases the handle portion so that the fixture will bear against the strap elements to hold them firmly in place.

In the present mold structure the end portions of the teeth 100b and 101b constitute the only support for the cross portions of the strap elements during the lead-burning operation. This is however a sufficient support since the cross portions are not heated in the burning operation to a molten temperature.

Following the station where the operator inserts the strap elements 120 and 121 and the hand fixture 128 is a lead-burning station. This station comprises a pair of acetylene burners 140a and 140b mounted on a carriage 140. The carriage is in the form of a heavy rocker arm having a long bearing 141 at one end embracing the axial upstanding shaft 23 of the conveyor. This bearing rests on a collar 142 pinned to the shaft 23 so as to hold the carriage at a fixed distance above the conveyor. The carriage extends radially from the shaft 23 and is reciprocated back and forth in timed relation with the conveyor so as to have an intermittent coincident motion therewith. During the successive periods of such coincident motion the burners are directed onto the respective rows of plate lugs to effect the burning operation, as will appear.

Each forward movement of the carriage is produced by latching it to the conveyor. The latching means comprises nine lugs 160 extending upwardly from the conveyor—one for each holder 26—and a catch 159 at the under side of the carriage (Figures 1 and 2). The catch is secured to the outer end of a shaft 157 extending lengthwise of the carriage along the under side thereof and journalled into bearings 158 depending therefrom. On the inner end of this shaft there is secured an arm 156 operable by an armature 155 of a solenoid 151 to move the catch into latching position in relation to the lugs 160 as shown in Figure 5.

The solenoid is controlled by an on-off toggle switch 143 mounted on a bracket 144 on the under side of the carriage. This switch has "on" and "off" push buttons 145 and 146 at its opposite ends. These push buttons are operated respectively by stop lugs 147 and 148 as the carriage moves through the end portion of its return and forward strokes, these stop lugs being mounted on a flange 150 of the aforementioned collar 142 on the shaft 23. The carriage is urged counterclockwise through its return stroke into initial position—the position it occupies in Figures 1 and 6—by a heavy torsion spring 154 that surrounds the shaft 23 and has one end secured to a collar 23a fixed thereon and the other end secured to the bearing or hub 141 of the carriage. Under action of this spring the "on" button of the switch 143 is pressed against the stop 147 to close the circuit of the solenoid 151, as will be apparent from a later description of the controlling circuit of the machine.

When the solenoid 151 is energized, the armature 155 is held upwardly and the catch 159 is held downwardly in latching position wherein it will abut against the oncoming lug 160 of the conveyor and cause the carriage to be moved in unison therewith. As the carriage is advanced through the end portion of its forward stroke—the forward stroke being an angular travel of approximately 37°—the "off" button 146 of the switch 143 is pressed against the other stop lug 148 to throw the switch to open position. This deenergizes the solenoid 151 to cause the armature 155 and the arm 156 to move downwardly under the influence of gravity and the catch to be moved to an unlatching position wherein it is out of the path of the lugs 160, as indicated in Figure 7. The carriage, being now released from the conveyor, is returned to initial position by the torsion spring 154. Upon its return to initial position the switch 143 is again closed, the solenoid 151 is again energized and the catch 159 is again moved to latching position. This restoration of the catch to latching position occurs before the catch reaches the next succeeding lug 160. Accordingly, shortly after the catch is restored to latching position, it will be engaged by the next succeeding lug to cause the carriage to be propelled through another forward stroke coincident with the motion of the conveyor.

The movement of the carriage by the spring 154 through its return stroke is retarded by a dashpot 215. This dashpot is pivotally connected to the lower arm of the U-bracket 180 on the post 14 (Figures 1 and 2) and has a piston rod 215a pivotally connected at 215b to a bracket arm 173 extending leftwardly from the hub of the carriage. The carriage 140 has a flat table-like surface with laterally-extending edges serving as a guide for a crosshead 162 which carries the torches or burners 140a and 140b aforementioned (see Figures 5, 6 and 7). A connecting rod 164 is pivoted at one end to a standard 163 on this crosshead and at the other end to an eccentric pin 165a on a disk crank 165 that is journalled on the carriage. Mounted on the carriage is a motor 168 which drives the disk crank through a gear reduction box 167. The disk crank 165 is turned one revolution per each advance stroke of the carriage to effect one complete reciprocation of the crosshead 162 during each period of coincident motion of the carriage with the conveyor. By this reciprocating movement the burners 140a and 140b are moved back and forth once along the respective rows of plate lugs of the cell group then passing through the burning station.

Figure 17:
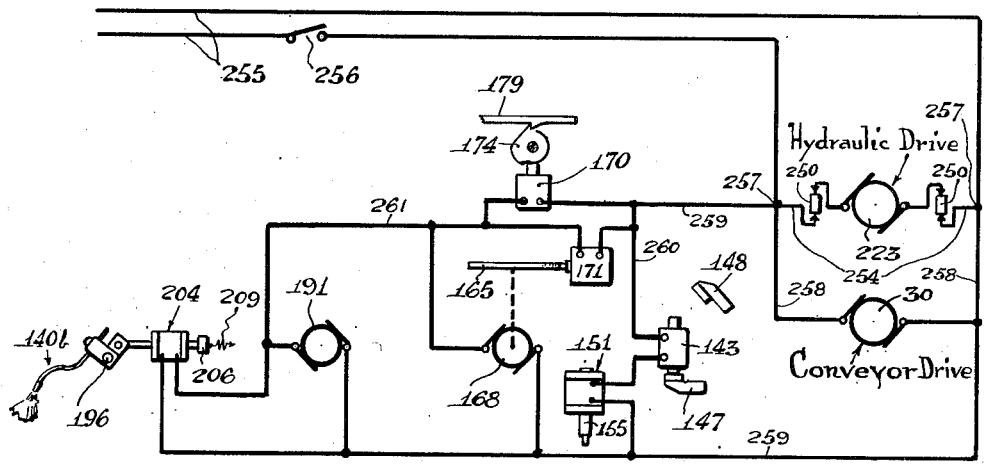
Figure 17 is a partially schematic and partially diagrammatic view showing the control apparatus of the present machine.

The disk crank 165 is timed to move through one revolution for each advance stroke of the carriage by means of two switches 170 and 171 controlling the motor 168. These switches are connected in parallel to each other and in series with the motor as shown in Figure 17. As is described in the next paragraph, the switch 170 is closed momentarily by the initial forward movement of the carriage to start reciprocation of the crosshead by the motor 168, and the switch 171 is closed incidental to the forward movement of the crosshead, to keep the motor 168 running, and is opened automatically at the end of each reciprocation of the crosshead to stop the motor 168. Thus, a reciprocation of the burners along the plate lugs is initiated by the start of each forward stroke of the carriage and is completed at least before the end of the forward stroke.

To control the switch 170 in the manner above described, it is mounted at the bottom of an upstanding U-bracket 172 carried at the end of the aforementioned carriage arm 173, as shown in Figures 1, 1a and 7. The switch is biased open and is closable by a rocker cam 174 operated against the switch push button 170a. This cam is pivoted between the two legs of the bracket 172 and is biased into an unoperated position by a torsion spring 178. The cam has an upwardly-extending tooth 176 engageable with a single tooth 182 of a rack 179. The free end of this rack rests slidably on the cam under pressure of a cantilever spring 183 secured to a cross member 184 at the top of the bracket 172. The other end of the rack 179 is pivoted at 181 (Figure 1) to the upper arm of the stationary bracket 180. As the carriage is advanced through its forward stroke, the bracket 172 is moved towards the end of the rack 179; in the initial portion of this movement the teeth 172 and 176 are engaged to cause the rack to turn the cam 174 to close the switch 170 momentarily to start the motor 168 and the reciprocation of the burners 140a and 140b along the plate lugs.

To control the switch 171 as above described, it is bracketed at 184 to the carriage in a position wherein its push button 171a confronts the periphery of the disk crank 165. The push button 171a is biased outwardly into switch-closing position and is moved inwardly by a peripheral cam 165a on the disk crank at the end of each revolution thereof defining a reciprocation of the crosshead 162. The momentary closing of the switch 170 by the carriage, as above described, causes the cam 165a to release the switch button 171a to closed position. Thereupon the switch 171 is controlling to maintain the motor 168 running until one full reciprocation of the crosshead is completed to move the burners back and forth once along the rows of plate lugs of the cell group.

In addition to reciprocating the burners along the rows of plate lugs as above described, the same are oscillated laterally so that the burners have a zigzag progressive and retrogressive path intersecting at intervals. This zigzag movement is effective in causing the burners to puddle the lead in a manner approximating the customary motion made by hand; this puddling action is beneficial in that it causes the lead to flow evenly and the straps to be fuzed positively to the plate lugs throughout their entire cross section. For this purpose, the burners 140a and 140b are mounted on the outer end of an oscillatory bar 186 pivoted at its central portion, as at 187, to the crosshead 162. This bar is oscillated by a motor 191 secured by bolts 192 on the crosshead. This motor drives a disk crank 189 through a gear reduction box 190, the box being mounted rigidly on the end of the motor and the disk crank being journalled in a horizontal plane to the under side of the box as shown in Figures 5 and 6. Depending from and eccentrically mounted on this disk crank is a pin 188 which slidably engages a bifurcated end 186a of the oscillatory bar. The motor 191 is connected in parallel with the motor 168, as shown in Figure 17, so that the bar will be oscillated only while the crosshead is being reciprocated to move the burners back and forth along the plate lugs.

Secured to the forward end of the bar 186 is a bearing block 195 which supports a lateral shaft 196 for rotation, there being collars 197 and 198 fastened to the shaft at the opposite ends of the block to hold the shaft from lengthwise play. On the outer end portions of this shaft are secured clamping blocks 199 and 200 which respectively hold the burners 140a and 140b as shown in Figures 5 and 6. The clamping blocks are adjustable along the shaft 196 by means of lock screws 203 so that the burners may be positioned properly for a given size of cell group. During the return stroke of the carriage the shaft 196 is held in a clockwise position, shown by dash-dot lines in Figure 5, to direct the burners away from the machine. For this purpose, a solenoid 204 is bracketed at 205 to the bar 186 and has its armature 206 connected by a rod 207 to a crank pin 208 on the aforementioned collar 197. The armature 206 is urged into a retracted position, wherein to hold the burners in their outwardly-directed position just mentioned, by a tension spring 209 connected between the armature and the crosshead 162. The solenoid is connected electrically in the current supply line 261 through the paralleled switches 170 and 171, as shown in Figure 17, so that it will be energized during the reciprocation of the cross head. When the solenoid is energized the armature is propelled forwardly to pivot the burners counterclockwise into their full-line positions shown in Figure 5. Thus, the burners are turned into their full-line positions at the start of the forward stroke of the carriage and are retained there during the reciprocation of the crosshead, to cause the burners to be moved back and forth once along the plate lugs, until the carriage reaches the end of its forward travel. Thereupon, the burners are swung outwardly away from the machine and concurrently the carriage is returned for a succeeding reciprocation to effect the lead burning operation on a succeeding cell group.

The hydraulic actuating system of the present machine comprises an accumulator 222 driven by a motor 223 both of which are mounted on a platform 224 bolted to standards 225 on the bottom plate 16 of the conveyor, as shown in Figures 2 and 4. This accumulator has a liquid-pressure outlet duct 226 and a liquid-return inlet duct 227. These ducts 226 and 227 are connected to the three hydraulic cylinders 79, 92 and 98 associated with each holder 26 by way of respective two-way valves 228, 229 and 230, it being understood that there is a set of three of these valves for each holder and that each valve has direct connections to and from the accumulator.

The valve sets just mentioned are mounted in rows on the bottom plate 16 of the conveyor, at the 40° spacing intervals between successive holders 26, as shown in Figure 4. Each valve has pressure and return ducts 231 and 232 at its opposite ends connected respectively to the pressure and return ducts 226 and 227 of the accumulator; additionally, each valve has two upstanding ducts 233 and 234 connected to the outer or base ends of the respective hydraulic cylinders (see Figures 3a and 4). Depending from each valve through a slot 235 in the plate 16 is a rocker arm for controlling the valve, which is referred to by the number of the respective valve with the suffix letter a. This arm is spring-urged clockwise into a straight-down position as shown in Figure 3a. When the control arm is in this downward position, the pressure duct 231 of each valve is connected through to the duct 234 leading to the base end of each cylinder, and the return duct 232 is connected through to the duct 233 leading to the outer end of each cylinder. Under these conditions, the pistons of the cylinders are urged outwardly. For instance, cylinder 79 then holds the clamping walls 69 and 70 open, cylinder 92 holds the support 80 in raised position and the cylinder 98 holds the clamping walls in their initial angular positions, all so as to place the holder in a receiving condition.

Each valve control arm has a roller journalled on its lower end referred to by the number of the valve with the suffix letter b. This roller rides up onto an arcuate rail provided on the top plate 16 of the base frame 10 to swing the control arm rearwardly as the valve is moved by the conveyor through a certain portion of its travel. As the control arm is swung rearwardly, it interchanges the connections of the ducts 231 and 232 with respect to the ducts 233 and 234. This interchange causes the piston of the respective hydraulic cylinder to be actuated inwardly. There are three of these arcuate rails 238, 239 and 240 corresponding to the valves 228, 229 and 230 respectively, as shown in Figures 3 and 4.

None of the rails are extended through an arc indicated as "Cell Group Loading" in Figures 1 and 3. Accordingly, at this loading station each holder will be maintained in condition to receive a loosely-assembled cell group. The rail 238, which operates the valve 228 controlling the cell-group clamping, is encountered immediately following this loading station, at a station C, by the valve-control arm 228a associated with the holder 226 then moving beyond the loading station, to cause the loose cell group in that holder to be clamped firmly by the walls 69 and 70. Next, at a station marked D, the valve control arm 229a associated with that holder rides onto the rail 239 to cause the support 80 of that holder to be lowered below the cell group. Thereupon, at a succeeding station E, valve-control arm 230a associated with that holder rides onto the rail 240 to cause the clamping walls of that holder to be inverted and the cell group to be turned to an upright position. All of the rails are continuous following station E through an arc of about 200° so as to cause each cell group to be held clamped in upright position as it is moved through this arc. In the first portion of this arc there is a station marked "Strap Elements Loading"; at this station an operator inserts a pair of strap elements 120—121 into the mold spaces of each holder as the holder moves thereby. In the intermediate portion of this arc there is a station marked "Burning" whereat the carriage 140 is moved with the conveyor through an angular range of about 37° to cause the burners 140a and 140b to fuze the plate lugs to the lead strap elements in the manner hereinbefore described.

Following the burning station, at station F, the rail 240 ends to allow the valve 230 to be restored to cause the clamping walls of that holder to be turned back 180° to their initial angular position and the cell group to be again held inverted with the plate lugs thereof extending downwardly. Succeeding station F is a discharging station J designated "Unloading" whereat rail 238 ends to allow valve 228 to be restored to cause the clamping walls 69 and 70 of that holder to be released. At this station an operator stands in readiness to grip each finished cell unit and to remove it from the machine as the unit is unclamped. At a next succeeding station H, rail 239 ends to allow valve 229 of that holder to be restored, causing the support 80 to be raised to initial position to restore the holder to its condition for receiving another loose cell group at the "Cell-Group Loading" station just following.

The operations described in the foregoing paragraph as to one of the holders 26 are carried out in succession with respect to successive holders so that cell groups are processed at the rate of nine per revolution of the conveyor. Except for the manual loading of the loose cell groups at the "Cell-Group Loading" station, the manual insertion of the strap elements at the "Strap Elements Loading" station and the manual removal of the finished units at the discharging station J, all operations are performed automatically.

The mechanism on the top plate 20 of the conveyor is enclosed by a circular cover comprising two semi-circular sections 247 each having a depending rim flange 247a along its arcuate edge meeting with the edge of the plate 20 and provided with respective clearance slots 247b for the shafts 52. Mounted on these cover sections are hoods 248 which cooperate with respective baffle plates 249 on the shafts 52 to enclose the gears 55 (Figures 1 and 2).

Current is supplied to the motor 223 on the conveyor via a pair of slip rings 250 mounted on the central upstanding shaft 22 of the conveyor and respective brushes 251 carried by a bracket 252 that is mounted on a stationary hollow shaft 23, as shown in Figure 2. The motor is connected by a cable 253 to the slip rings, and the brushes are connected by a cable 254 leading through the hollow shaft 23 and out of the upper end thereof, as shown.

The electric circuit diagram for the entire machine is shown in Figure 17. This circuit diagram comprises a two-wire cable 255 adapted to be connected to a source of power not shown, as to a 110-volt line. Serially connected in one lead of this cable is a master switch 256. This cable 255 is connected at 257 to the cable 254 leading through the slip rings 250 and brushes 251 to the motor 223 as just described. Also connected to the power supply cable at junctions 257 is a cable 258 leading to the conveyor drive motor 30. Furthermore, connected to this power supply cable is a pair of leads 259 for supplying power to the remaining motors and solenoids of the machine. One branch circuit 260 across these leads 259 serially includes the carriage-operated switch 143 and the latching solenoid 151. In parallel with the branch 260 is a branch 261 which includes the switches 170 and 171 in parallel with each other and the motors 168 and 191 as well as the solenoid 204 in parallel with each other. Thus, as has been hereinbefore fully described, whenever the master switch is closed the conveyor drive motor 30 and the conveyor drive motor 223 are in operation. Further, when the carriage-operated switch 143 is closed the latching solenoid 151 is energized to render the carriage latch operative. Also, when either of the paralleled switches 170 and 171 is closed the motor 168 is driven to reciprocate the burners, the motor 191 is driven to oscillate the burners sidewise, and the solenoid 204 is energized to cause the burners to be directed inwardly onto a cell group.

The embodiment of my invention herein shown and described is illustrative and not limitative of my invention since the same is subject to many changes and modifications without departure from the scope of my invention which I endeavor to express according to the following claims.

I claim:

1. In a machine for lead-burning strap elements to the lugs of a stack of battery plates, comprising a conveyor and a holder on said conveyor adapted to receive said stack in an arrangement wherein the lugs of the plates are in a row transverse to the path of traveling movement of the holder: the combination of a burning station past which said holder is moved by said conveyor, including a carriage mounted for coincident movement with said conveyor and a burner mounted on said carriage both for reciprocating movement transversely to the direction of travel of said holder and for oscillating movement in the path of said traveling movement; means for moving said carriage with said conveyor; reciprocating means mounted on said carriage for effecting said reciprocating movement of said burner; and means timed with said reciprocating means for effecting said oscillatory movement to cause said flame to move along said row with a zigzag motion.

2. In a machine for lead-burning strap elements to the lugs of stacks of battery plates comprising a conveyor and a series of holders on said conveyor for said stacks respectively, said holders being adapted to receive said stacks with the plate lugs in rows transverse to the direction of movement of the holders: the combination of a burning station comprising a reciprocative carriage mounted for intermittent coincident movement with said conveyor and a burner mounted on said carriage for transverse zigzag movement relative to the carriage travel; means on said carriage normally directing said burner away from the path of said holders; latch means for connecting said carriage to said conveyor when each holder reaches said burning station; means responsive to initial advance movement of said carriage by said conveyor for moving said burner inwardly onto the respective holder and for imparting one transverse reciprocation to said burner as it is advanced through said station; spring means for returning said carriage; and control means operable by said carriage as said burner is moved into an end portion of said station for releasing the carriage from said conveyor and for concurrently stopping said reciprocating means and moving said burner away from the path of said holders.

3. In a machine for lead-burning strap elements to battery plate assemblies including a conveyor having a series of holders for respective battery plate assemblies the lugs of the plates of which are in rows transverse to the direction of travel: the combination of a lead-burning station including a burner carriage reciprocated in timed relation with said conveyor along the path of said holders to move in unison with successive holders through said station; a burner mounted on said carriage for transverse reciprocation in a zigzag path along the row of plate lugs of each plate assembly as the plate assembly is moved through said station; means for so reciprocating said burner; and a control system for said reciprocating means comprising a control device responsive to initial forward movement of said carriage for starting said reciprocating means; and a second control device operated by said reciprocating means at the completion of one reciprocation of said burner for stopping the reciprocating means.

References Cited in the file of this patent

UNITED STATES PATENTS

| | | |
|---|---|---|
| 871,393 | Flanders | Nov. 19, 1907 |
| 1,358,869 | Norris | Nov. 16, 1920 |
| 1,389,155 | Norris | Aug. 30, 1921 |
| 1,531,753 | Norris | Mar. 31, 1925 |
| 1,635,369 | Lee | July 12, 1927 |
| 1,841,194 | Lormor | Jan. 12, 1932 |
| 1,884,683 | Hermani | Oct. 25, 1932 |
| 1,938,387 | Irwine | Dec. 5, 1933 |
| 1,960,195 | Nyce | May 22, 1934 |
| 2,082,080 | Palucki | June 1, 1937 |
| 2,430,188 | Sargent | Nov. 4, 1947 |
| 2,463,158 | De Lorme | Mar. 1, 1949 |
| 2,505,514 | Anderson | Apr. 25, 1950 |
| 2,516,546 | Brown | July 25, 1950 |
| 2,533,919 | Christiansen et al. | Dec. 12, 1950 |
| 2,539,318 | Orsino | Jan. 23, 1951 |
| 2,603,178 | Cahenzli | July 15, 1952 |
| 2,625,897 | Mann et al. | Jan. 20, 1953 |